US006779241B2

(12) United States Patent
Mangone, Jr.

(10) Patent No.: US 6,779,241 B2
(45) Date of Patent: Aug. 24, 2004

(54) METHOD FOR FORMING AN ENCLOSURE

(76) Inventor: Peter G. Mangone, Jr., P.O. Box 3128, Evergreen, CO (US) 80437

( * ) Notice: Subject to any disclaimer, the term of this patent is extended or adjusted under 35 U.S.C. 154(b) by 0 days.

(21) Appl. No.: 10/459,031

(22) Filed: Jun. 10, 2003

(65) Prior Publication Data

US 2003/0208897 A1 Nov. 13, 2003

Related U.S. Application Data

(60) Division of application No. 09/894,517, filed on Jun. 27, 2001, now Pat. No. 6,606,786, which is a continuation-in-part of application No. 09/439,464, filed on Nov. 15, 1999, now Pat. No. 6,298,549.

(51) Int. Cl.$^7$ .......................... B25B 25/00; B23Q 7/10
(52) U.S. Cl. ..................... 29/446; 29/809; 29/243.5; 29/243.56; 29/453; 24/543
(58) Field of Search ............. 29/451, 453, 505, 29/521, 434, 809, 243.5, 243.56, 11, 446; 24/543, 489, 516, 494, 498, 513, 518, 545; 140/53, 57; 16/225, DIG. 13

(56) References Cited

U.S. PATENT DOCUMENTS

| | | | | | |
|---|---|---|---|---|---|
| 4,798,231 A | * | 1/1989 | Glaus et al. | ................. | 140/119 |
| 4,801,061 A | * | 1/1989 | Mangone, Jr. | .............. | 227/120 |
| 5,020,355 A | * | 6/1991 | Payne et al. | .................. | 72/407 |
| 5,350,267 A | * | 9/1994 | Mangone, Jr. | .............. | 411/442 |
| 5,938,099 A | * | 8/1999 | Ciccarelli | ..................... | 227/19 |

* cited by examiner

Primary Examiner—David P. Bryant
Assistant Examiner—Jermie E. Cozart
(74) Attorney, Agent, or Firm—Klaas, Law, O'Meara & Malkin, P.C.; Michael A. Goodwin, Esq.

(57) ABSTRACT

Methods for moving a device from an opened position to a closed position so as to enclose at least two relatively rigid articles. The device may include at least two members pivotally connected together at one end portion thereof for pivotal movement about a longitudinal axis and having locking apparatus at the other end portion thereof. Moving the device from the opened position to the closed position may include applying a force to at least one portion of the device.

2 Claims, 7 Drawing Sheets

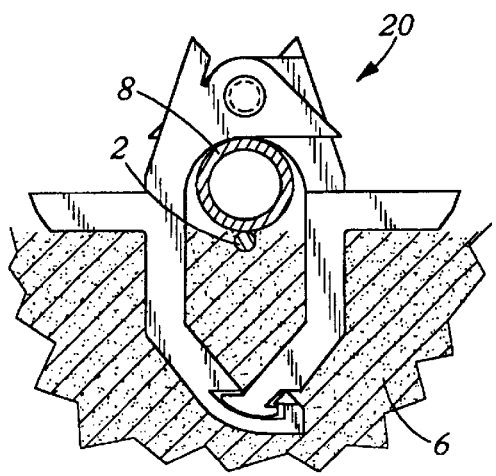
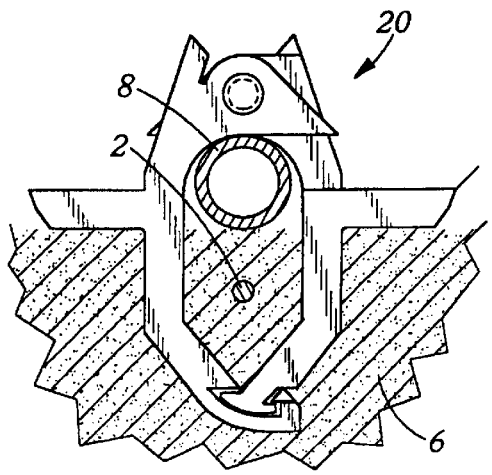
Figure 14  Figure 15
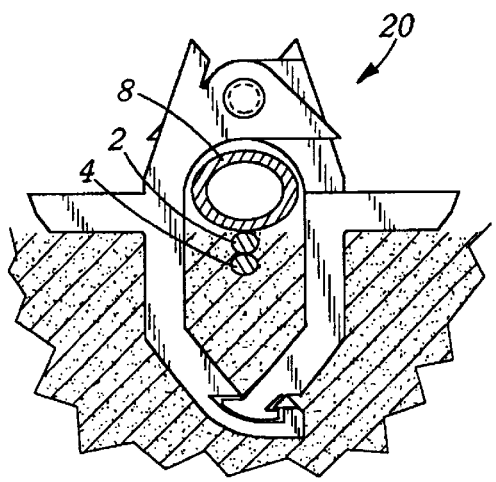
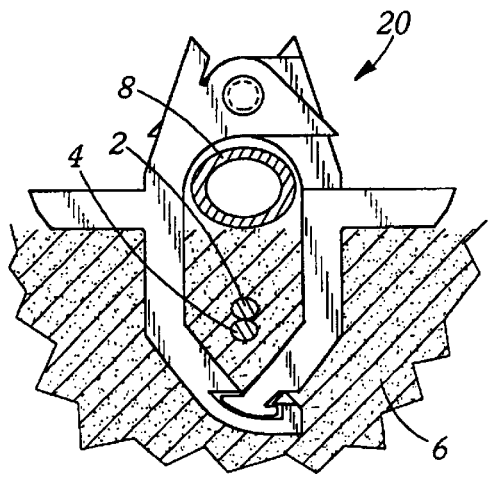
Figure 16  Figure 17

METHOD FOR FORMING AN ENCLOSURE

This application is a divisional of U.S. patent application Ser. No. 09/894,517 of Peter G. Mangone, Jr. for APPARATUS AND METHOD FOR FORMING AN ENCLOSURE, filed Jun. 27, 2001, now U.S. Pat. No. 6,606,786, which is a divisional continuation-in-part of U.S. patent application Ser. No. 09/439,464 of Peter G. Mangone, Jr. for APPARATUS AND METHOD FOR FORMING AN ENCLOSURE, filed Nov. 15, 1999, now U.S. Pat. No. 6,298,549, both of which are hereby incorporated by reference for all that is disclosed therein.

FIELD OF THE INVENTION

This invention relates generally to a device for forming an enclosure for portions of at least two relatively rigid articles and more particularly to a device for enclosing portions of at least two relatively rigid articles in an adjacent relationship but to permit limited relative movement therebetween.

BACKGROUND OF THE INVENTION

In many instances, it is desirable to enclose portions of a plurality of relatively rigid articles in a close relationship. In some instances, the close relationship permits relative movement between the relatively rigid articles and in other instances such relative movement is not permitted or at least is restrained. In one such instance, relative movement is permitted during the formation of a final product but is not permitted after the final product has been formed. Such instance relates to the provision of radiant heating for a driveway. In one system for providing such radiant heating, the radiant heating tubing is attached to a wire mesh as the radiant heating tubing is being placed over the wire mesh in a desired relationship. This attachment is accomplished using ties of various constructions which are wrapped around portions of the wire mesh and the radiant heating tubing. In some instances, where additional strength is required, conventional rebar is added to the wire mesh or the conventional rebar is used in place of the wire mesh. In either construction, conventional ties are used either to locate the conventional rebar or to attach the radiant heating tubing to the conventional rebar. In other types of construction wherein conventional rebar is used to strengthen a structure, such as those using cement or concrete, the pieces of conventional rebar are attached together using the conventional ties as or before they are moved into the desired location. While the conventional ties do function for their intended purpose, the workers who use them find them time consuming and bothersome. Therefore, there exists a need for a different system other than the use of the conventional ties.

BRIEF DESCRIPTION OF THE INVENTION

This invention provides a device that can be used in a modification of a conventional tool to enclose in an automatic operation portions of at least two relatively rigid articles in a desired relationship. In the preferred embodiments of the invention, the at least two relatively rigid articles comprise portions of the wire mesh or rebar and portions of the radiant heating tubing used in the installation of radiant heating at desired locations.

In one preferred embodiment of the invention, a device for enclosing at least two relatively rigid articles in a desired relationship comprises at least two members each having an inner surface and an outer surface. Each of the at least two members is elongated and has a central body portion, an integral pivot portion, an integral locking portion and an abutment portion extending outwardly from a portion of the outer surface. The pivot apparatus provides a pivotal connection for mounting the at least two members for pivotal movement between opened and closed positions. An abutment stop is provided on each of the pivot portions for limiting the pivotal movement of the at least two members in the opened position. The locking portion on one of the at least two members comprises a flexible end portion having a recess formed therein, and the locking portion on the other of the at least two members comprises an end portion having a configuration to mate with the recess. A first guide projects outwardly from a portion of the flexible end portion adjacent toward one side of the recess and a second guide projects inwardly from another portion of the end portion adjacent to an opposite side of said recess. A slot is formed in a portion of the outer surface of the end portion and is located to pass over the first guide and to receive therein at least a portion of the second guide. Also, a recess is formed in an adjacent portion of the outer surface of the other end portion next to the slot to receive therein at least a portion of the second guide.

Apparatus for moving the above-described device from an opened position to a closed position so as to enclose at least two relatively rigid articles uses a modification of a conventional tool wherein a feed track supports a row of devices in an opened position and urges the row of devices in a direction toward an end plate of the tool so that the forewardmost device of the row of devices is urged against the end plate. The end plate has a generally planar surface to be contacted by the facing surface of the foremost device. The tool also has a force applying apparatus for applying an equal amount of force to the spaced apart abutment portions of the device. A guide projects inwardly from the generally planar surface toward the row of clips and has a first guiding surface and, spaced therefrom, a second guiding surface. The foremost device in the row of devices is urged against the generally planar surface of the end plate so that a control portion of one of the at least two members is facing one of the first and second guiding surfaces and a control portion of the other of the at least two members is facing the other of the first and second guiding surfaces. The force applying apparatus is located relative to the abutment portions so that the force applying apparatus contacts the abutment portions to apply a force thereto to move the control portions of the at least two members into contact with the first and second guiding surfaces to cooperate in controlling the movement of the control portions of the at least two members over the first and second guiding surfaces. The first and second guiding surfaces are contoured to move the at least two members from an opened position to a closed position containing the at least two relatively rigid members between the at least two members. The flexible end portion and the other end portion are located so that the application of force on the abutment portions moves the other end portion into contact with the flexible end portion to move the flexible end portion into the recess. The pivot portions of the two members of the device have a total thickness which is slightly less than the thickness of the central body portion, the locking portion and the abutment portions so that substantially all of the facing surface of the device contacts the generally planar surface of the end plate. In the one preferred embodiment of the invention, the pivot portion having a pivot pin has a thickness less than the thickness of the other pivot portion having an opening therein. Each of the first and second guiding surfaces has a straight portion and a tapered portion. The force applying apparatus applies substantially the same amount of force to each of the abutment portions. Also, the end plate has two spaced apart prongs projecting from a lower edge thereof to assist in locating the at least two relatively rigid articles into a position to be enclosed by the device. In some instances, the end plate may be provided with a stop projecting from the generally planar surface of the end plate located between the prongs for limiting the movement of the device over the end plate. In the one preferred embodiment of the invention, the cross-sectional area defined by the inner surfaces when the device is in a closed position is substantially greater than the cross-sectional area of the relatively rigid articles contained therein. If desired, the device can be dimensioned so that at least portions of the relatively rigid articles within the device when in a closed and locked position are in contacting relationship with portions of the inner surface of the device and portions of each other. A method for moving the above-described device from an opened position to a closed position so as to enclose at least two relatively rigid articles uses a modification of a conventional tool wherein a feed track supports a row of devices in an opened position and urges the row of devices in a direction toward an end plate of the tool so that the foremost device of the row of devices is urged against the end plate and the tool also has a force applying apparatus for applying an equal amount of force to spaced apart portions of the device and wherein the end device is formed from a relatively rigid material, is elongated and has at least two members being pivotally connected together at one end portion thereof for pivotal movement about a longitudinal axis and having a locking apparatus at the other end portions thereof and has an inner surface and an outer surface. The method comprises applying an equal amount of force on spaced apart portions of the end device to move at least a control portion of one of the at least two members into contact with a first guiding surface on the end plate and at least a control portion of the other of the at least two pivotally connected members into contact with a second guiding surface on the end plate so that the locking end portions of the two members are in a spaced apart relationship; moving the at least two members over the end plate while maintaining the contact of the cooperating control portions of the at least two members in contact with the first and second guiding surfaces; forming the first and second guiding surfaces so that the end portions, having the locking apparatus, are moved toward each other; locating the at least two members so that at least two relatively rigid articles are located between the inner surfaces of the at least two members; and moving the end portions having the locking apparatus together so that the end moves into a closed position with the at least two relatively rigid articles contained therein. The method further comprises stopping the movement of the pivotally connected end portions over the end plate; and applying a sufficient force on the spaced apart portions to move the end portions having the locking apparatus so that the other end member flexes the flexible arm and as the movement is and continued, snaps into the recess to lock the end portions together. The method further comprises guiding the other end portion over the flexible am, to restrain relative movement therebetween in a longitudinal direction; and restraining relative movement between the other end portions in a longitudinal direction when in a locked together position.

In another embodiment of the invention, the pivot apparatus comprises a living hinge extending between and integral with each of the pivot portions and having additional guide apparatus for guiding the pivotal movement of the at least two members from the opened position toward the closed position. The additional guide apparatus comprises an arcuate groove in one of the pivot portions and an outwardly projecting portion on the other of the pivot portions which projecting portion moves in the arcuate groove as the at least two members move from the opened toward the closed position. The arcuate groove is tapered having a relatively wide entrance portion and a relatively narrow end portion and the outwardly projecting portion is also tapered having a relatively narrow entrance portion and a relatively narrow end portion. The groove and the outwardly projecting portion are dimensioned so that, when in the closed position, all portions of the groove and the outwardly projecting portion are in a contiguous almost touching relationship.

Unlike the one preferred embodiment of the invention where the front and back surfaces of the device are of substantially the same construction so that when either the front or back surface of the device contacts the planar surface of the end plate, the device functions the same, the device of the invention having the living hinge has a front surface that differs from its back surface. Also, the central body portions of such device of the invention are smaller in length than the central body portions of the above-described embodiment. However, it is understood that the central body portions can be made of any length so long as they can surround the relatively rigid articles involved. The shortening of the central body portions is accompanied by a change in the contour of the guiding surfaces of the guide. The straight sections of the guiding surfaces are longer and, in fact, may extend below the portion of the end plate between the two prongs. In this embodiment, the guiding surfaces hold the two members in the opened position until the locking means can surround the relatively rigid articles. In some instances, the end plate and therefor a portion of the tool may be raised upwardly before the two members can be moved to the closed position. Therefore, the front surface of the device having the living hinge functions substantially the same as the one preferred embodiment described above. However, the method of using the back surface is different.

If the row of devices having a living hinge is placed in the tool so that the back surface of each device is moved into contact with the end plate, the method comprises applying a force on at least a portion of one of the at least two members to move a first portion of the at least one of the at least two members into contact with a first guiding surface on the end plate and at least another portion of the one of the at least two pivotally connected members into contact with a second guiding surface on the end plate so that the locking end portions are in a spaced apart relationship. Moving the at least two members over the end plate while maintaining the portions of the at least one of the at least two members in contact with the first and second guiding surfaces and forming the first and second guiding surfaces so that the end portions, having the locking apparatus, are moved toward each other. Locating the at least two members so that at least two relatively rigid articles are located between the inner surfaces of the at least two members and moving the end portions having the locking apparatus together so that the device moves into a closed position with the at least two relatively rigid articles contained therein.

When the two relatively rigid articles comprise at least a portion of a tubing for radiant heating and at least a portion of a wire mesh for supporting the radiant tubing on a bed of particulate material, the method further comprises embedding at least a portion of the closed and locked end device in the particulate material.

BRIEF DESCRIPTION OF THE DRAWINGS

Illustrative and presently preferred embodiments of the invention are shown in the accompanying drawings in which:

FIGS. 14–17 illustrate the use of the device with a section of radiant heating tubing and a wire mesh;

DETAILED DESCRIPTION

Figure 1:
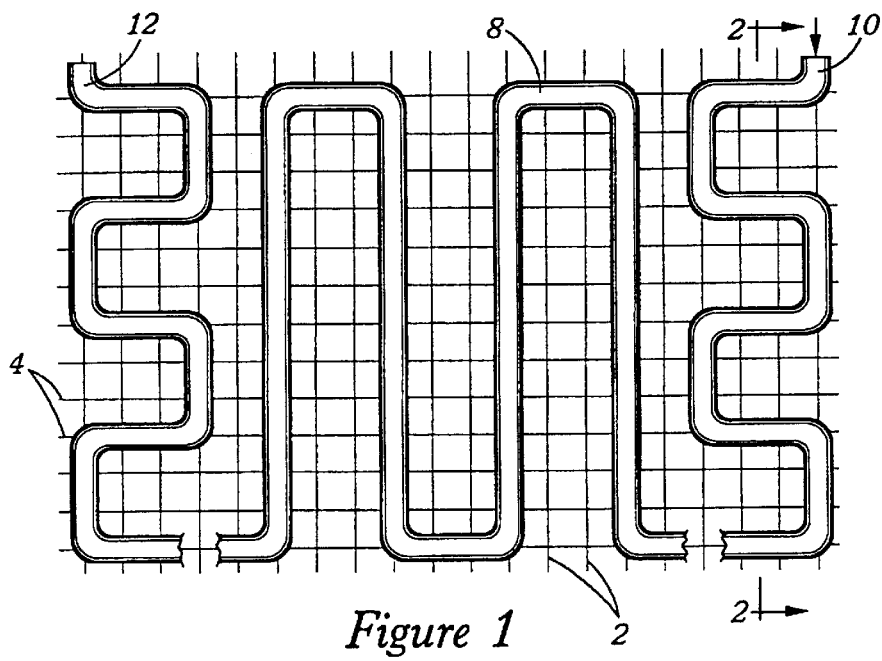
FIG. 1 is a top plan view of a portion of a conventional radiant heating structure for use in providing radiant heating for a suitable location such as a driveway.
Figure 2:
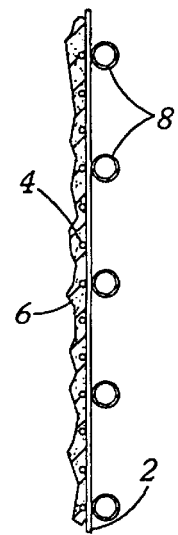
FIG. 2 is a cross-sectional view taken on the line 2—2 of FIG. 1.

In FIGS. 1 and 2, there is illustrated one of the many types of different installation designs used to provide radiant heating for a variety of structures such as driveways, athletic fields and others. The type illustrated in FIGS. 1 and 2 comprises a conventional wire mesh comprising intersecting wires 2 and 4 which are secured together at least at various intersections. The wire mesh is preferably laid over a bed of particulate material, which as illustrated in FIG. 2 comprises conventional sand 6 but can comprise other types of particulate material such as pebbles, styrofoam, and other materials having similar characteristics. Radiant heating tubing 8 is installed over the wire mesh. As illustrated in FIG. 1, the radiant heating tubing 8 has a plurality of straight sections and integral curved sections that extend in different directions. The radiant heating tubing 8 has an inlet 10 and an outlet 12 so that a heating fluid may be passed through the radiant heating tubing. It is understood that there will be many sections of radiant heating tubing 8 for an overall structure. The wires 2 and 4 forming the wire mesh typically have diameters of between about 0.156 and 0.500 inch and the radiant heating tubing may have diameters between about 0.375 and 0.875 inch.

Figure 10:
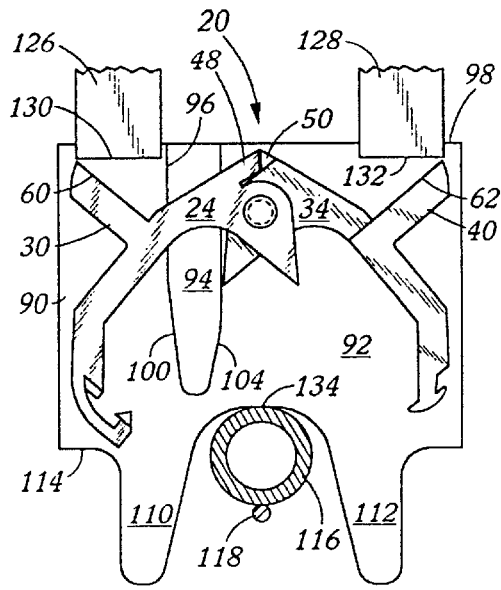
FIGS. 10–13 illustrate the movement of a device from an opened position to a closed position.

The construction of the device 20, FIG. 10, is illustrated in FIGS. 3–9 and comprises one member 22 comprising a pivot portion 24; a central body portion 26, preferably integral with the pivot portion 24; a locking portion 28, preferably integral with the central body portion 26; and an abutment portion 30, preferably integral with the central body portion 26 and extending outwardly therefrom. Another member 32 comprises a pivot portion 34; a central body portion 36, preferably integral with the pivot portion 34; a locking portion 38, preferably integral with the central body portion 36; and an abutment portion 40, preferably integral with the central body portion 36 and extending outwardly therefrom. In one embodiment, the central body portions 26 and 36, the locking portions 28 and 38 and the abutment portions 30 and 40 have substantially the same thickness. In this embodiment, the thickness of the pivot portion 34 having the pivot pin 42 is not as thick as the pivot portion 24 having the circular opening 46. The ratio between the thicknesses of the pivot portions 24 and 34 depends upon the size of the members 22 and 32 and the material from which they are formed. This structure is desirable for the pivot arrangement illustrated in FIGS. 4 and 5. If the pivot arrangement is different, such as a recessed opening in each of the pivot portions 24 and 34 so that the pivot portions 24 and 34 could be pivotally connected by a rivet, then the thicknesses of the pivot portions 24 and 34 could be substantially the same. In any event, the total thickness of the pivot portions 24 and 34 is slightly less than any of the thicknesses of the central body portions 26 and 36, the locking portions 28 and 38 and the abutment portions 30 and 40. Other types of pivots, such as a living hinge, can be used to pivotally connect the two pivot portions 24 and 34 together. In one embodiment, each of the central body portions 26 and 36; the locking portions 28 and 38 and the abutment portions 30 and 40 has a thickness of about 0.250 inch; the pivot portion 24 has a thickness of about 0.145 inch and the pivot portion 34 has a thickness of about 0.100 inch.

A pivot pin 42 is integral with the pivot portion 34 and projects outwardly therefrom. The pivot pin 42 has an enlarged head portion 44 having a diameter larger than the diameter of the pivot pin 42. The pivot portion 24 has a circular opening 46 extending therethrough with a portion having a diameter to mate with the pivot pin 42 and a portion having a diameter to mate with the enlarged head portion 44. As illustrated in FIG. 10, the pivot portions 24 and 34 are pivotally joined together by press fitting the pivot pin 42 and the enlarged head portion 44 through the opening 46 so as to pivot around a longitudinal axis. The pivot portion 24 has an abutment 48 projecting outwardly therefrom, and the pivot portion 34 has an abutment 50 projecting outwardly therefrom. As illustrated in FIG. 10, the abutments 48 and 50 move into an abutting relationship to limit the movement of the device 20 in an opened position.

The member 22 and the another member 32 have facing inner surfaces 52 and 54 and outer surfaces 56 and 58. The abutment 30 has an abutment surface 60 and the abutment 40 has an abutment surface 62.

Figure 13:
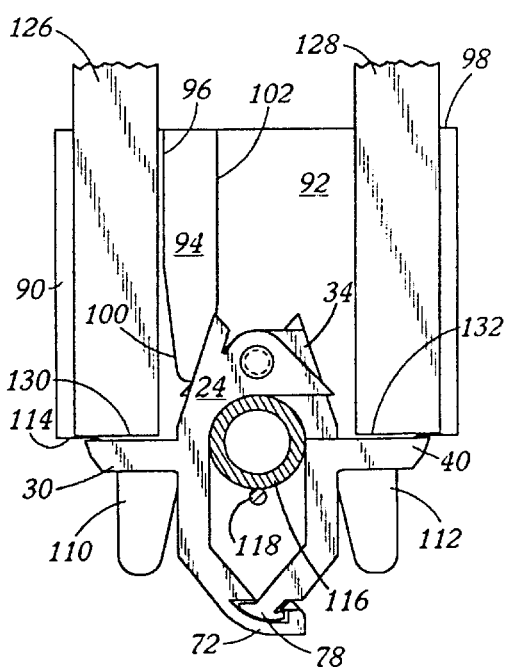

The locking portion 28 has a recess 70 formed by a flexible arm 72. At one end of the recess 70, there is a downwardly projecting stop 74 for a purpose described below. At the other end of the recess 70, the flexible arm 72 is provided with an upwardly projecting guide 76 for a purpose described below. The locking portion 38 has a hook portion 78 that is contoured to cooperate with the recess 70 to hold the member 22 and the another member 32 locked together when in a completely closed position as illustrated in FIG. 13. The hook portion 78 has a slot 80, FIG. 9, formed in the portion thereof facing the locking portion 28 and an arcuate recess 82 formed in its bottom surface 84. As described below, as the member 22 and the another member 32 are moved toward a closed position, the slot 80 moves over the guide 76 and the bottom surface 84 of the hook portion 78 moves the flexible arm 72 downwardly. The arcuate recess 82 then moves over the guide 76 to guide the further movement of the hook portion 78. The slot 80 then moves over the stop 74 and the hook portion 78 moves into the recess 70 as the flexible arm 72 resides back to its original position. In embodiments of this invention, the member 22 and the another member 32 are each integrally molded using a plastic material comprising a polyethylene; a nylon or other materials having similar characteristics.

Figure 3:
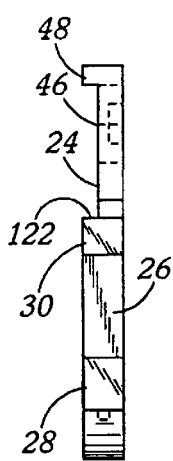
FIG. 3 is an end elevational view taken from the left side of FIG. 4.
Figures 4, 5:
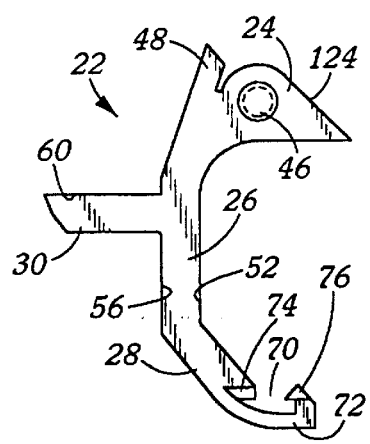
FIG. 4 is an elevational view of one member of a device.
FIG. 5 is an elevational view of the other member of the device.
Figure 6:
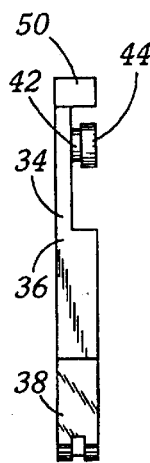
FIG. 6 is an end elevational view taken from the left side of FIG. 5.
Figure 7:
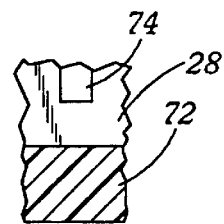
FIG. 7 is an end elevational view, with parts removed, of the lower portion of FIG. 4 looking from the right of FIG. 4.
Figure 8:
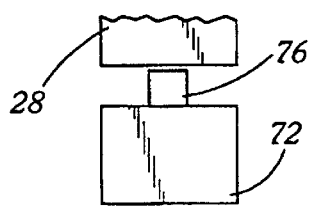
FIG. 8 is an end elevational view of the lower portion of FIG. 4 looking from the right of FIG. 4.
Figure 9:
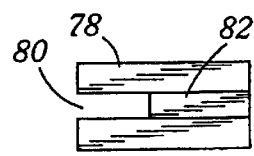
FIG. 9 is a bottom plan view of a portion of FIG. 5.

The movement of the device 20 from an opened position illustrated in FIG. 10, to a closed position, illustrated in FIG. 13, is controlled by a modification of a conventional tool of the type illustrated in U.S. Pat. Nos. 4,801,061 and 5,350,267 which are incorporated herein by reference thereto. In such a modification of a conventional tool, a plurality of devices 20 in the opened position, illustrated in FIG. 10, are supported on a magazine and preferably resiliently urged toward an end plate 90, illustrated in FIGS. 10–13. In this tool, an end device 20 is resiliently urged against a generally planar surface 92 of the end plate 90. As illustrated in FIGS. 3 and 6 and as explained above, the pivot portions 24 and 34 have a total thickness which is slightly less than the thickness of the central body portions 26 and 36, the locking portions 28 and 38 and the abutment portions 30 and 40 so that the facing surface of the foremost device 20 is compatible with the generally planar surface 92.

The end plate 90 has a guide 94 that, in a preferred embodiment, projects outwardly from the generally planar surface 92 for a distance that is the smaller of the differences between the thickness of either of the pivot portions 24 and 34 versus the thickness of the central body portions 26 and 36. The guide 94 has a first guiding surface and a second guiding surface. As illustrated in FIGS. 10–13, the first guiding surface has a first portion 96 that extends downwardly from and is perpendicular to the top edge 98 of the end plate 90 and a second portion 100 that is inclined to the first portion 96, which in the embodiment of the invention described above is about 12 degrees. The second guiding surface is spaced from the first guiding surface and has a first portion 102, FIGS. 11–13, that extends downwardly from and is perpendicular to the top edge 98 of the end plate 90 and a second portion 104, FIGS. 10 and 11, that is inclined to the first portion 102, which in the embodiment of the invention described is about 10 degrees. In the embodiment of the invention described above, the first portion 96 has a linear extent of about 1.250 inch; the second portion 100 has a linear extent of about 0.875 inch; the first portion 102 has a linear extent of about 1.625 inch and the second portion 104 has a linear extent of about 0.500 inch. It is to be understood that the foregoing dimensions are for a device 20 having a specific size, as described above, and the first and second guiding surfaces may be designed with different dimensions to cooperate with different sizes of devices which are sized to cooperate with the different sizes of the relatively rigid articles to be enclosed within the device 20.

The end plate 90 has two spaced apart prongs 110 and 112 extending downwardly from the lower edge 114 of the end plate 90 and are sized so that portions of various relatively rigid articles will be positioned therebetween and in FIGS. 10–13, the relatively rigid articles comprise a portion 116 of the radiant heating tubing 8 and a portion 118 of one of the wires 2 and 4 which are positioned therebetween as the device 20 is closed about them as described below. As illustrated in FIG. 10, when the foremost device 20 is moved into contact with the generally planar surface 92, the surface 120 of the pivot portion 34, FIG. 5, faces the first portion 102 and edge 122 of the abutment 30, FIG. 3, faces the first portion 96. It is understood that the position of the end device 20 may be reversed so that the surface 124 of the pivot portion 24 faces the first portion 102 and the edge 126, FIG. 5, faces the first portion 96. When the portions of the pivot portions 24 and 34 are in contact with the first portions 96 and 102, a recess is formed into which the guide projects. As stated above, the thickness of this recess is not greater than the smaller of the differences between the thickness of either of the pivot portions 24 and 34 and the thickness of the central body portions 26 and 36.

Figure 11:
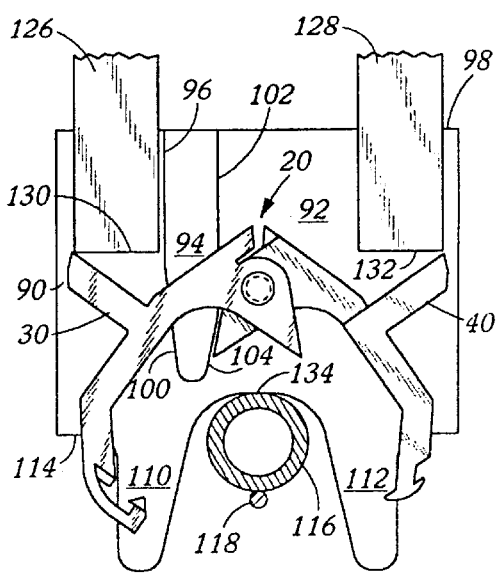
Figure 12:
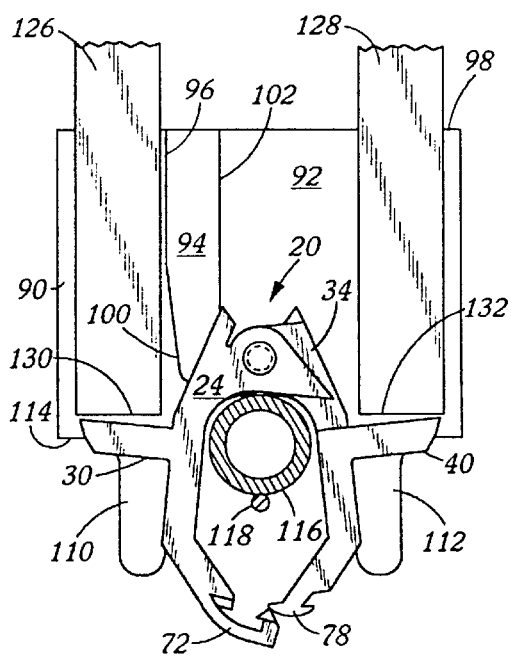

The movement of the end device 20 from an opened position to a closed position is illustrated in FIGS. 10–13. In FIG. 10, the foremost device 20 has been moved against the generally planar surface 92 so that a control portion thereof comprising the surface 120 faces the first portion 102 and another control portion comprising the edge 122 faces the first portion 96. The tool has two spaced apart force applying plungers 126 and 128 having lower surfaces 130 and 132 located to contact a portion of the abutment surfaces 60 and 62 to apply an equal amount of force to the abutments 30 and 40. As illustrated in FIG. 10, the portion 134 of the end plate 90 has been placed in contact with the portion 116 of the radiant heating tube 8. As the plungers 126 and 128 begin to apply the force, at least the control portion of the surface 120 moves into contact with the first portion 102 and the control portion of the edge 122 moves into contact with the first portion 96 to hold the pivotally connected members 22 and 32 in the opened position as the device 20 is moved downwardly over the generally planar surface 92. As the force is continued to be applied, the foremost device 20 is moved over the generally planar surface 92 with at least a control portion of the surface 120 in contact with the second portion 104 and the control portion of the edge 122 in contact with the second portion 100 so that the end device 20 has been moved into a partially closed position as illustrated in FIG. 11. As the foremost device 20 continues to be moved downwardly over the generally planar surface 92, the edge 122 moves out of contact with the second portion 100 and the surface 120 is out of contact with the second portion 104 as illustrated in FIG. 12. The lower edges of the pivot portions 24 and 34 have moved into contact with the portion 116 to stop the movement of the foremost device 20 over the generally planar surface 92. The locking portions 28 and 38 have been moved toward each other so that the hook portion 78 has moved into contact with the flexible arm 72 to begin to apply a force thereto and the portions 116 and 118 are enclosed within the inner surfaces 52 and 54 of the member 22 and the another member 32. The plungers 126 and 128 continue to apply a force to the abutments 30 and 40 to move the locking members 28 and 38 so that the hook portion 78 deflects the flexible arm 72 and snaps into the recess 70 as the flexible arm 72 resides as described above and illustrated in FIG. 13. As illustrated in FIG. 13, the area enclosed by the inner surfaces 52 and 54 is substantially greater than the area of the portions 116 and 118. This is an acceptable arrangement when the device 20 is being used in the installation of radiant heating tubing 8 over the wire mesh having the wires 2 and 4. This arrangement will permit the concrete or other similar material to be poured over the radiant heating tubing 8 and the wire mesh without undue movement of the radiant heating tubing 8. However, it is understood that the device 20 can be designed to provide less movement of the relatively rigid materials to be enclosed within the inner surfaces 52 and 54. Some of the examples of such devices 20 and the relatively rigid articles enclosed therein are disclosed and described in relation to FIGS. 14–23.

The tool may be used to install the device 20 to enclose the relatively rigid articles in a number of ways. If the particulate material is of such a size that it will not clog the recess 70 or if no particulate material is being used, the tool is positioned over the top relatively rigid article with the portion 134 of the end plate 90 in contact therewith and the device 20 is then moved over the relatively rigid articles as described above.

If the particulate material is of a size that it might fill the recess 70, such as the sand of FIGS. 1 and 2 under the wire mesh tubing, it may be desirable to lift a portion of the wire mesh and the radiant heating tubing from the sand and place the portion 134, FIGS. 10 and 11, of the end plate 90 in contact with a portion of the radiant heating tubing 8. The foremost device 20 is then moved over the generally planar surface as described above to enclose portions of the wire mesh and the radiant heating tubing. After being enclosed, the lower portion of the device 20 may be embedded into the sand.

FIG. 14 illustrates the use of the device 20 as described above to enclose portions of the relatively rigid wire 2 of the wire mesh and the radiant heating tubing 8. As illustrated in FIG. 14, portions of the wire 2 and the radiant heating tubing 8 are in a contacting relationship and a portion of the wire 2 is embedded in the sand 6. However, the wire 2 may move away from the radiant heating tubing 8 to one of several locations in the sand 6. One such location is illustrated in FIG. 15.

FIG. 16 is similar to FIG. 14 but illustrates the installation of the device 20 at a location of the intersection of the wires 2 and 4 of the wire mesh. As illustrated in FIG. 16, portions of the wires 2 and 4 are in a contacting relationship and portions of the wire 2 and the radiant heating tubing 8 are in a contacting relationship. Also, the wires 2 and 4 are embedded into the sand 6. FIG. 17 is similar to FIG. 15 in that the wires 2 and 4 are spaced at one of many locations from the radiant heating tubing. It is understood that after being enclosed within the device 20, at least portions of the radiant heating tubing 8 may also be embedded into the sand 6 either by accident or design.

Figure 18:
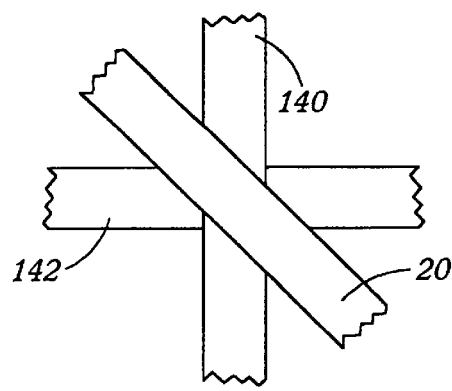
FIG. 18 is a schematic top plan view of the device installed over an intersection of conventional rebar.
Figure 19:
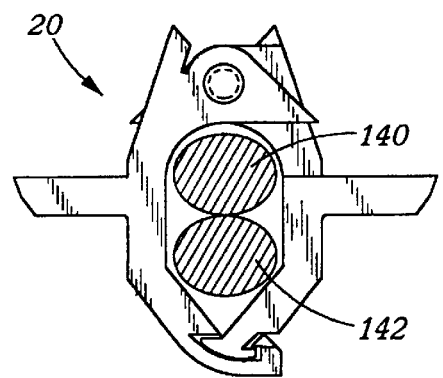
FIG. 19 is a cross-sectional view of the conventional rebar of FIG. 18 enclosed within the device.

FIGS. 18 and 19 illustrate the use of the device 20 to enclose any two relatively rigid articles 140 and 142 for any desired purpose. For example, the relatively rigid articles could be conventional rebar that is used to reinforce any type of structure using concrete or a material having similar characteristics or any two linear or curved cylindrical objects. The device 20 in FIGS. 18 and 19 has dimensions differing from the dimensions of the device 20 illustrated in FIGS. 10–17 so that the dimensions of the device 20 also differ. In FIGS. 18 and 19, the two relatively rigid articles are enclosed at an intersection. However, they can also be enclosed by a device 20 when they are in a parallel relationship.

Figure 20:
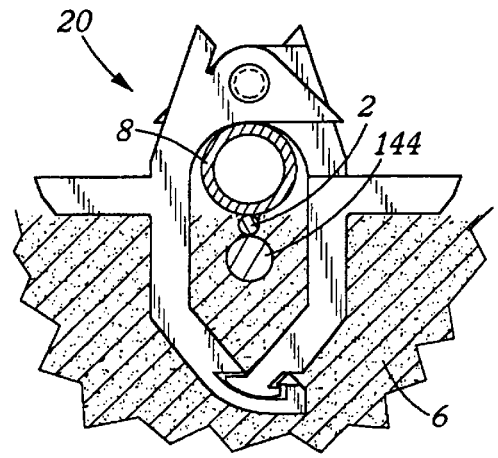
FIGS. 20–22 illustrate the use of the device with a section of radiant heating tubing, wire mesh and conventional rebar.

In some instances wherein it is desired to install radiant heating tubing the wires, 2 and 4 of the wire mesh do not provide sufficient reinforcement. In such instances, another reinforcing material, such as conventional rebar is used with the wire mesh. FIG. 20 illustrates the use wherein the device 20 encloses portions of a radiant heating tubing 8, a wire 2 and a conventional rebar 144 in a parallel relationship. In FIG. 20, portions of the rebar 144 and the wire 20 are in a contacting relationship and portions of the wire 2 and the radiant heating tubing are in a contacting relationship with the wire 2 and the rebar 144 embedded in the sand 6. It is understood, that these relatively rigid articles could be spaced from each other.

Figure 21:
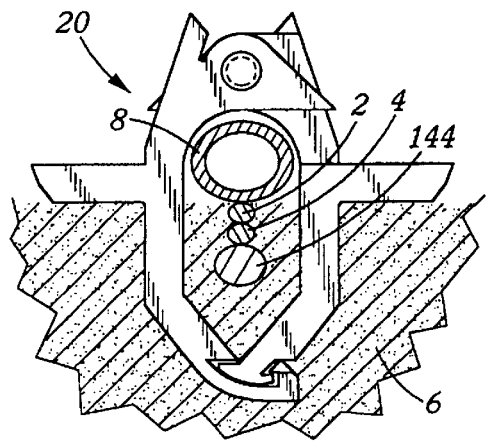

In FIG. 21, the device 20 is used at the intersection of the wires 2 and 4 and encloses portions of the radiant heating tubing 8, the wires 2 and 4 and the rebar 144. As described above, these relatively rigid articles could be in a spaced apart relationship.

Figure 22:
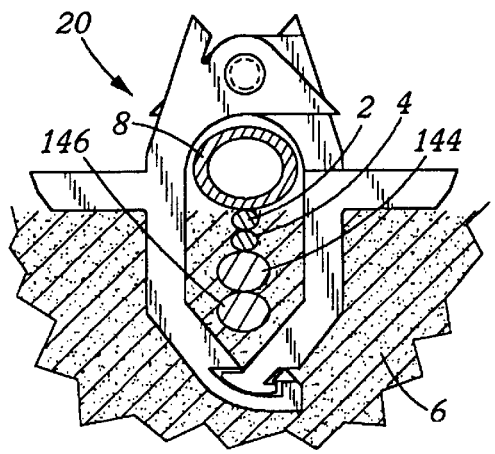

In FIG. 22, the device 20 is used at the intersection of the wires 2 and 4 and the intersection of two portions of rebar 144 and 146 and encloses portions of the radiant heating tubing 8, the wires 2 and 4 and the rebar 144 and 146. As discussed above, the radiant heating tubing 8, the wires 2 and 4 and the rebar 144 and 146 could be in a spaced apart relationship.

Figure 23:
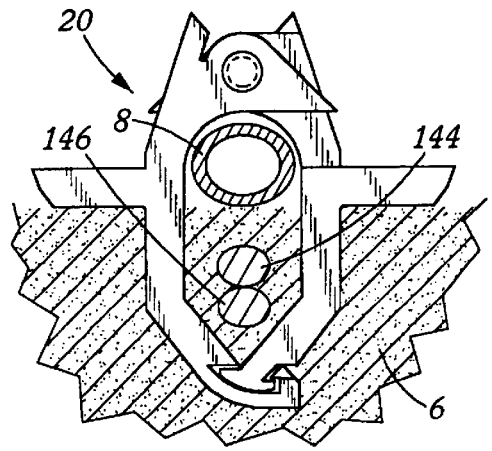
FIG. 23 illustrates the use of the device with a section of radiant heating tubing and the intersection of conventional rebar.

In some instances, the wires 2 and 4 can be omitted and the reinforcement may comprise only rebar 144 and 146. In FIG. 23, the device 20 is used at the intersection of the rebar 144 and 146. As discussed above, the rebar 144 can be in contact with the radiant heating tubing 8 or the rebar 144 and 146 could be in other locations spaced from the radiant heating tubing 8.

Figure 24:
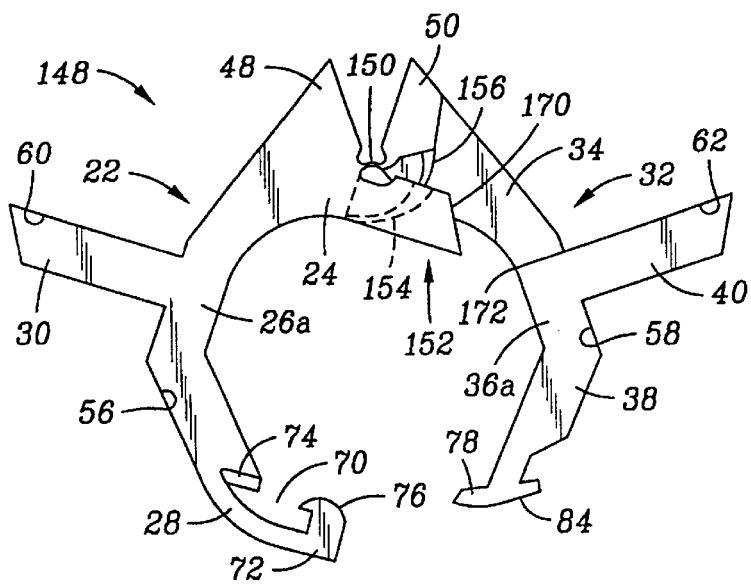
FIG. 24 is a front elevational view of another modification.
Figure 25:
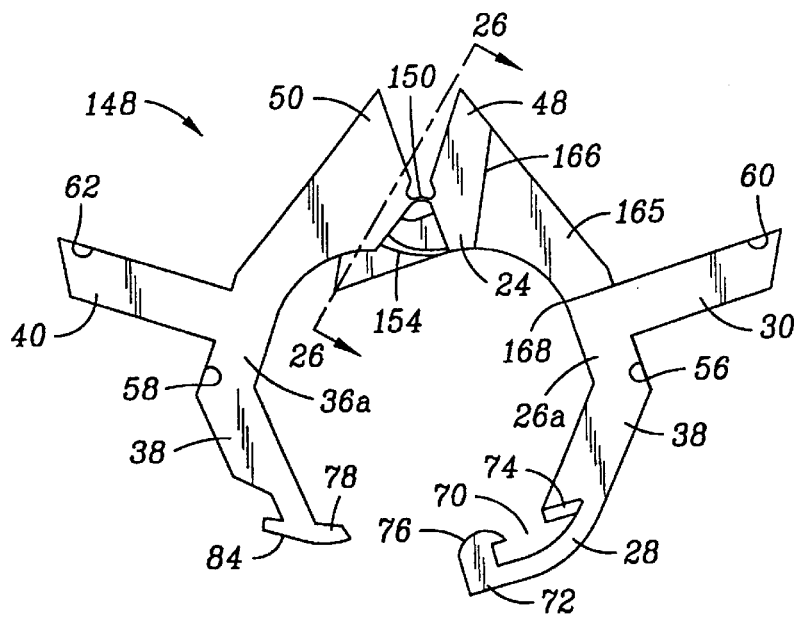
FIG. 25 is a back elevational view of FIG. 24.
Figure 26:
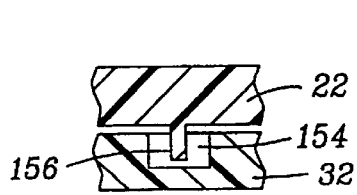
FIG. 26 is a partial cross-sectional view taken on the line 26—26 of FIG. 25.
Figure 27:
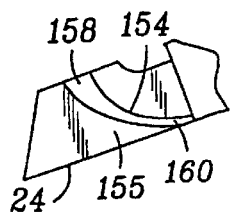
FIG. 27 is a bottom plan view of a section of the member in FIG. 24 having the groove formed therein.
Figure 28:
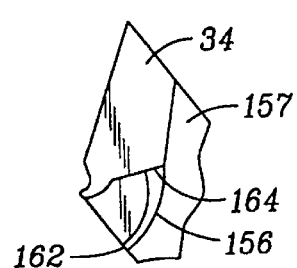
FIG. 28 is a top plan view of a section of the member in FIG. 24 having a projection formed thereon.
Figure 32:
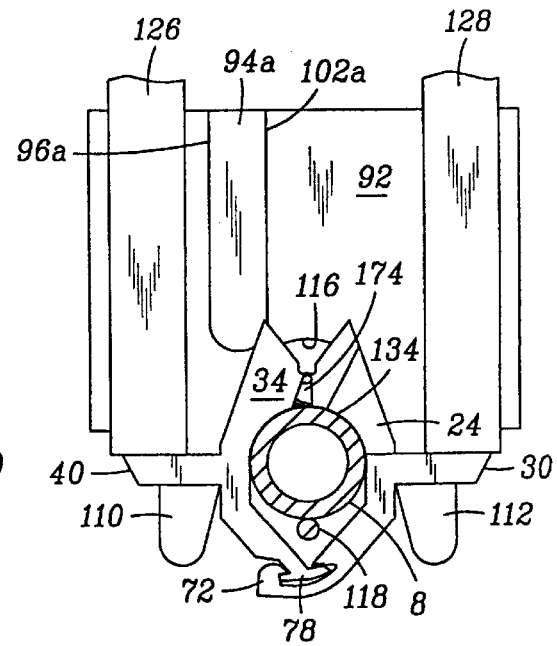

A modification of the invention is illustrated in FIGS. 24–28. The device 148 in FIGS. 24–28 has parts corresponding to those in FIGS. 3–9 and these parts have been given the same reference numerals. The pivot arrangement in FIGS. 24–28 comprises a living hinge 150 that extends between and is integral with the pivot portions 24 and 34. While the use of a living hinge is not new and may be readily substituted for the pivot pin 42 and opening 46 of FIGS. 3–6, the living hinge 150 of this invention is combined with guide apparatus 152 which is particularly illustrated in FIGS. 26–28. The guide apparatus 152 comprises an arcuate groove 154 formed in the bottom surface 155 of the pivot portion 24 and an arcuate projection 156 formed on the top surface 157 of the pivot portion 34 and is shaped correspondingly to the arcuate groove 154 so that a rotational movement exists therebetween. As illustrated in FIG. 27, the arcuate groove 154 is tapered having a wide entrance portion 158 and a narrow end portion 160. As illustrated in FIG. 28, the arcuate projection 156 has a narrow entrance portion 162 and a wide end portion 164. When the device 148 is in the fully closed position, as illustrated in FIG. 32, the wide end portion 164 of the arcuate projection 156 is located in the wide entrance portion 158 of the arcuate groove 154 and the narrow entrance portion 162 of the arcuate projection 156 is located in the narrow end portion 160 of the arcuate groove 154. The dimensions of the arcuate groove 154 and the arcuate projection 156 are such that, when the device 148 is in the fully closed position, the arcuate projection 156 and the arcuate groove 154 are in a contiguous, almost touching relationship. This together with the locking portions 28 and 38 allows the device 148 to become very rigid. Another difference in the device of the invention having the living hinge 150, as illustrated in FIGS. 24 and 25, is that the central body portions 26a and 36a are substantially smaller in length relative to the central body portions 26 and 36 in FIGS. 4 and 5. Also, the guide 94a projecting inwardly from the end surface 92 has a configuration that differs from the configuration of the guide 94. The straight guiding surfaces 96a and 102a extend in a downward direction for a substantially greater distance than the straight guiding surfaces 96 and 102 of the guide 94 and, in fact, can extend to a location on the end surface 92 that is slightly below the portion 134 between the two prongs 110 and 112. The other parts of the device 148 such as the abutments 30 and 40 and the locking portions 28 and 38. As explained below, the shorter central body portions 26a and 36a and the different guide 94a result in a slightly different mode of operation for the device 148. It is also noted that the portion 165, FIG. 25, is about one-half of the thickness of the abutment 48 and the abutment portion 30 so as to provide the control surface 166 and the edge 168.

As illustrated in FIG. 24, the front surface of the device 148, except for the living hinge 150 and the shorter central body portions 26a and 36a, is substantially the same as the device 20. It is understood that the device 20 can comprise the shorter central body portions 26a and 28a. However, the back surface of the device 148, as illustrated in FIG. 25, is different. The pivot portion 24 adjacent the living hinge 150 has a thickness substantially the same as the thickness of the abutment 30. At a distance from the living hinge 150, the pivot portion 24 has a thickness of about one-half of the thickness of the abutment 40 to form a control surface 166 projecting inwardly from the surface of the pivot portion 24. The control surface 156 cooperates with the control edge 168 to cooperate with the guide 94a as the device 148 is moved downwardly over the end plate 92 as explained below. When the back surface of the device 148 is moved into contact with the end surface 92 and a downwardly directed force is applied to the abutments 30 and 40, a portion of the control surface 166 and the control edge 168 of the abutment 30 contact the guiding surfaces 96a and 102a as explained below.

Figure 29:
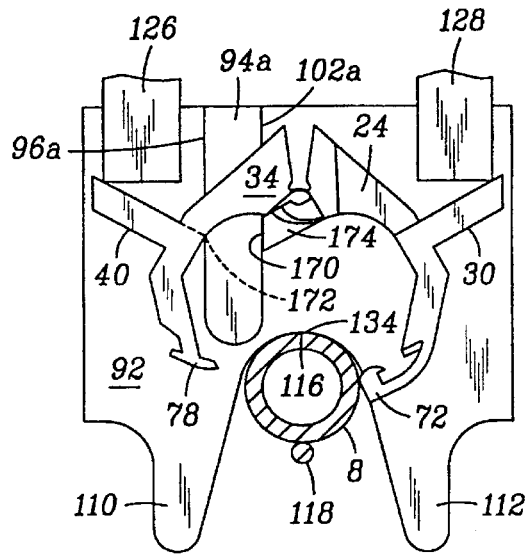
FIGS. 29–32 illustrate the movement of the device in FIG. 24 from an opened position to a closed position.
Figure 30:
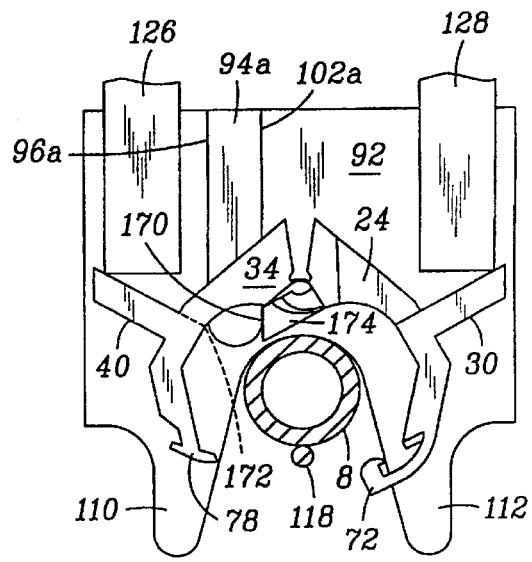
Figure 31:
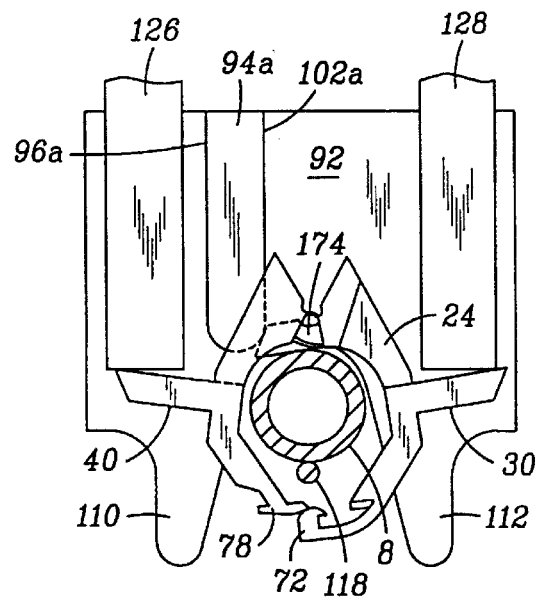

The movement of the end device 148 of FIG. 24 from an opened position to a closed position is illustrated in FIGS. 29–32. In FIG. 29, the foremost device 148 has been moved against the generally planar surface 92 so that a control portion thereof comprising the control surface 170 faces the second portion 102a and another control portion comprising the control edge 172 faces the first portion 96a. The tool has two spaced apart force applying plungers 126 and 128 having lower surfaces 130 and 132 located to contact a portion of the abutment surfaces 60 and 62 to apply an equal amount of force to the abutments 30 and 40. As illustrated in FIG. 29, the portion 134 of the end plate 90 has been placed in contact with the portion 116 of the radiant heating tube 8. As the plungers 126 and 128 begin to apply the force, at least the control portion of the control surface 170 moves into contact with the first portion 102a and the control portion of the control edge 172 moves into contact with the first portion 96a to hold the pivotally connected members 22 and 32 in the opened position as the device 148 is moved downwardly over the generally planar surface 92. As the force is continued to be applied, the foremost device 148 is moved over the generally planar surface 92 with at least a control portion of the control surface 170 in contact with the second portion 102a and the control portion of the control edge 172 almost out of contact with the first portion 96a so that the end device 148 is ready to be moved into a closed position as illustrated in FIG. 30. The guide surfaces 96a and 102a of the guide 94a extend for a greater distance to insure that the device 148 with the shorter central body portions 26a and 36a remain in an opened position until the device has moved over the heating tube 8 and the wire 118. As the foremost device 20 continues to be moved downwardly over the generally planar surface 92, the lower edges 174 of the pivot portion 24 has moved into contact with the portion 116 to stop the downward movement of the foremost device 148 move the generally planar surface 92. As the downward directed force is still being applied by the force applying plungers 126 and 128, either the end plate 90 and therefore the tool is moved upwardly or the heating tube 8 and the portion 118 are moved downwardly away from the edge 134. The locking portions 28 and 38 have been moved toward each other so that the hook portion 78 has moved into contact with the flexible arm 72 to begin to apply a force thereto and the heating tube 8 and the wire portion 118 are enclosed within the inner surfaces 52 and 54 of the member 22 and the another member 32. The plungers 126 and 128 continue to apply a force to the abutments 30 and 40 to move the locking members 28 and 38 so that the hook portion 78 deflects the flexible arm 72 and snaps into the recess 70 as the flexible arm 72 resides as described above and illustrated in FIG. 32. As illustrated in FIG. 32, the area enclosed by the inner surfaces 52 and 54 is slightly greater than the area of the heating tube 8 and the wire portion 118.

Figure 33:
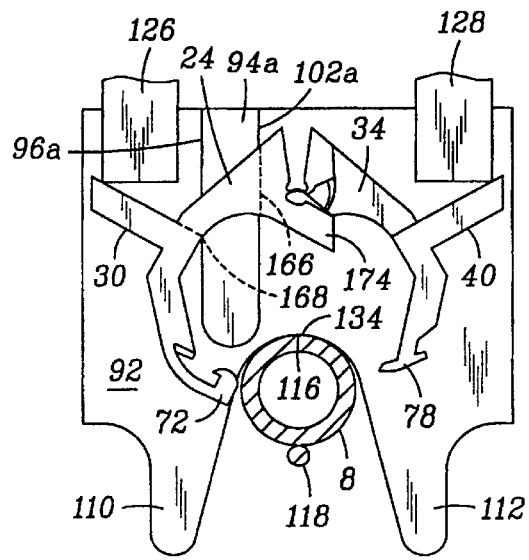
FIGS. 33–36 illustrate the movement of the device in FIG. 25 from an opened position to a closed position.
Figure 34:
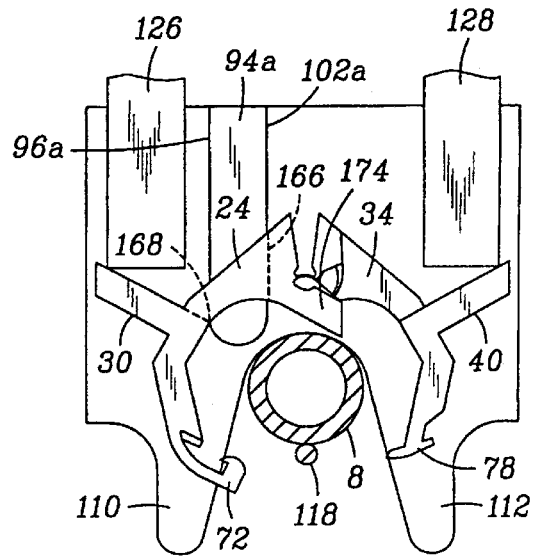
Figure 35:
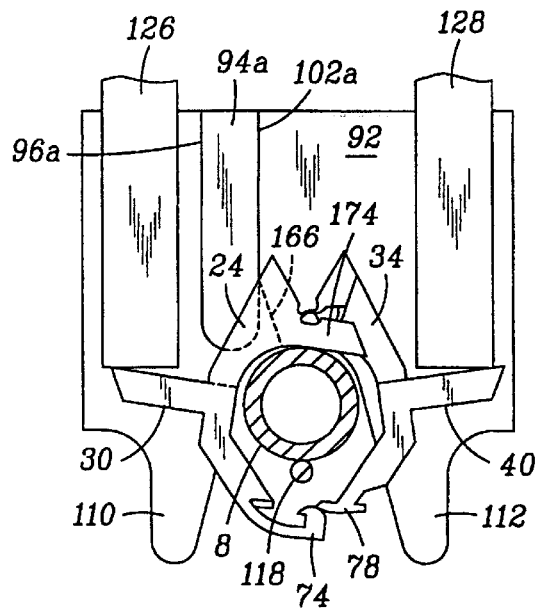
Figure 36:
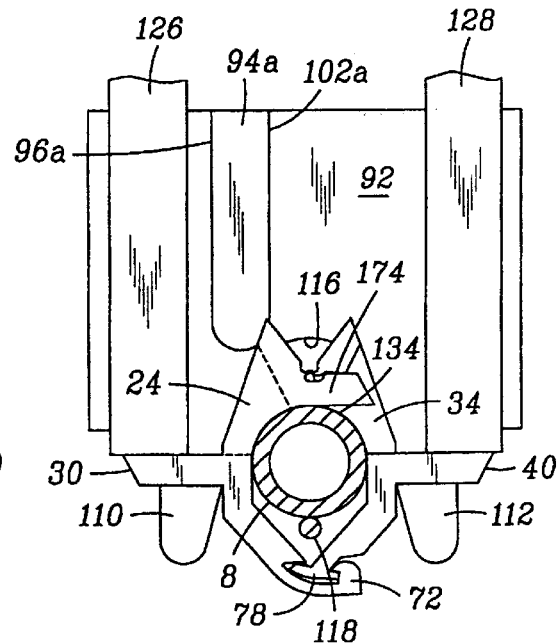

The movement of the end device 148 of FIG. 25 from an opened position to a closed position is illustrated in FIGS. 33–36. In FIG. 33, the foremost device 148 has been moved against the generally planar surface 92 so that a control portion thereof comprising the control surface 166 faces the second portion 102a and another control portion comprising the control edge 168 faces the first portion 96a. The tool has two spaced apart force applying plungers 126 and 128 having lower surfaces 130 and 132 located to contact a portion of the abutment surfaces 60 and 62 to apply an equal amount of force to the abutments 30 and 40. Since no portion of the member 32 is prevented from movement, it moves downwardly with the member 22. As illustrated in FIG. 33, the portion 134 of the end plate 90 has been placed in contact with the portion 116 of the radiant heating tube 8. As the plunger 126 begins to apply the force, the control portion of the control surface 166 moves into contact with the second portion 102a and the control portion of the control edge 168 moves into contact with the first portion 96a to hold the pivotally connected members 22 and 32 in the opened position as the device 148 is moved downwardly over the generally planar surface 92. As the force is continued to be applied, the foremost device 148 is moved over the generally planar surface 92 with at least a control portion of the control surface 166 in contact with the second portion 102a and the control portion of the control edge 168 in contact with the first portion 96a until the end device 148 is ready to be moved into the closed position as illustrated in FIG. 34. As the foremost device 148 continues to be moved downwardly over the generally planar surface 92, the lower edge 174 of the pivot portions 24 has moved into contact with the portion 116 to stop the movement of the foremost device 148 over the generally planar surface 92. As the downward directed force is still being applied by the force applying plungers 126 and 128, either the end plate 90 and therefore the tool is moved upwardly or the heating tube 8 and the portion 118 are moved downwardly away from the edge 134. As illustrated in FIG. 35, the locking portions 28 and 38 have been moved toward each other so that the hook portion 78 has moved into contact with the flexible arm 72 to begin to apply a force thereto and the heating tube 8 and the wire portion 118 are enclosed within the inner surfaces 52 and 54 of the member 22 and the another member 32. The plungers 126 and 128 continue to apply a force to the abutments 30 and 40 to move the locking members 28 and 38 so that the hook portion 78 deflects the flexible arm 72 and snaps into the recess 70 as the flexible arm 72 resides as described above and illustrated in FIG. 36. As illustrated in FIG. 36, the area enclosed by the inner surfaces 52 and 54 is slightly greater than the area of the heating tube 8 and the wire portion 118. While illustrative and presently preferred embodiments of the invention have been described in detail herein, it is to be understood that the inventive concept may be otherwise variously embodied and employed and that the appended claims are intended to be construed to include such variations except insofar as limited by the prior art.

What is claimed is:

1. Method for moving a device from an opened position to a closed position so as to enclose at least two relatively rigid articles using a tool wherein a feed track supports a row of devices in an opened position and urges the row of devices in a direction toward an end plate of the tool so that the foremost device of the row of devices is urged against the end plate and the tool also having force applying apparatus for applying an equal amount of force to spaced apart portions of the device and wherein said device comprises at least two members pivotally connected together at one end portion thereof for pivotal movement about a longitudinal axis and having a locking apparatus at the other end portion thereof and each having an inner surface and an outer surface wherein said method comprises:

applying an equal amount of force on spaced apart portions of said device to move at least a control portion of one of said at least two members into contact with a first guiding surface on said end plate and at least a control portion of the other of said at least two pivotally connected members into contact with a second guiding surface on said end plate so that locking end portions of said at least two members are in a spaced apart relationship;

moving said at least two members over said end plate while maintaining said control portions of said at least two members in contact with said first and second guiding surfaces to hold said device in said opened position;

providing said first and second guiding surfaces so that said end portions, having said locking apparatus, can be moved toward each other;

locating said at least two members so that at least two relatively rigid articles are located between said inner surfaces of said at least two members; and moving said end portions having said locking apparatus together so that said device moves into a closed position with said at least two relatively rigid articles contained therein.

2. Method for moving a device from an opened position to a closed position so as to enclose at least two relatively rigid articles using a tool wherein a feed track supports a row of devices in an opened position and urges the row of devices in a direction toward an end plate of the tool so that the foremost device of the row of devices is urged against the end plate and the tool also having force applying apparatus for applying a force to at least one portion of the device and wherein said device comprises at least two members pivotally connected together at one end portion thereof for pivotal movement about a longitudinal axis and having a locking apparatus at the other end portion thereof and each having an inner surface and an outer surface wherein said method comprises:

applying a force on at least a portion of one of said at least two members to move a first portion of said at least one of said at least two members into contact with a first guiding surface on said end plate and at least another portion of said one of said at least two pivotally connected members into contact with a second guiding surface on said end plate so that locking end portions of said at least two members are in a spaced apart relationship;

moving said at least two members over said end plate while maintaining said control portions of said at least one of said at least two members in contact with said first and second guiding surfaces to hold said device in said opened position;

providing said first and second guiding surfaces so that said end portions, having said locking apparatus, can be moved toward each other;

locating said at least two members so that at least two relatively rigid articles are located between said inner surfaces of said at least two members; and moving said end portions having said locking apparatus together so that said device moves into a closed position with said at least two relatively rigid articles contained therein.

* * * * *